United States Patent
Patton et al.

(10) Patent No.: US 11,590,919 B1
(45) Date of Patent: Feb. 28, 2023

(54) MOUNTING BRACKET FOR CURTAIN AIRBAG

(71) Applicant: ZF Passive Safety Systems US Inc., Washington, MI (US)

(72) Inventors: Richard Patton, Ortonville, MI (US); Dylan Moran, Rochester Hills, MI (US); Avadhoot Paranjpe, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 3 days.

(21) Appl. No.: 17/408,759

(22) Filed: Aug. 23, 2021

(51) Int. Cl.
*B60R 21/213* (2011.01)
*B60R 21/232* (2011.01)
*B60R 21/231* (2011.01)

(52) U.S. Cl.
CPC .......... *B60R 21/213* (2013.01); *B60R 21/232* (2013.01); *B60R 21/23138* (2013.01)

(58) Field of Classification Search
CPC ............ B60R 21/231; B60R 21/23138; B60R 21/232; B60R 21/201
See application file for complete search history.

(56) References Cited

U.S. PATENT DOCUMENTS

| | | | | |
|---|---|---|---|---|
| 2015/0130168 A1* | 5/2015 | Vinssac | ................. | B60R 21/213 280/728.2 |
| 2016/0250989 A1* | 9/2016 | Morrell | ................. | B60R 21/232 280/728.2 |
| 2016/0297391 A1* | 10/2016 | Ma | ......................... | B60R 21/232 |
| 2020/0282945 A1* | 9/2020 | McKeon | ............... | B60R 21/214 |
| 2021/0009071 A1* | 1/2021 | Valles Rey | ........... | B60R 21/232 |
| 2021/0146871 A1* | 5/2021 | Patton | .................... | B60R 21/213 |
| 2021/0253053 A1* | 8/2021 | Callewaert | .............. | B60R 21/20 |
| 2021/0316693 A1* | 10/2021 | Silverwood | ........... | B60R 21/215 |
| 2022/0227322 A1* | 7/2022 | Witt, Jr. | .................. | B60R 21/20 |

* cited by examiner

*Primary Examiner* — Karen Beck
(74) *Attorney, Agent, or Firm* — Tarolli, Sundheim, Covell & Tummino LLP

(57) ABSTRACT

An airbag module for helping to protect an occupant of a vehicle includes a curtain airbag and a mounting bracket. The curtain airbag includes a mounting tab configured to receive a fastener for connecting the curtain airbag to the vehicle. The mounting bracket is configured to cooperate with the mounting tab to facilitate the connection of the curtain airbag to the vehicle via the fastener. The mounting bracket includes a generally planar body portion and a fastening structure that extends transversely from the body portion. The mounting tab includes overlying layers of material that help define a pocket configured to receive the mounting bracket. The mounting tab includes a first fastener opening configured to receive the fastening structure so that the fastening structure extends through the first fastener opening with the body portion positioned in the pocket. The fastening structure is configured for installation in the vehicle structure to initially support the airbag module in the vehicle. The airbag module further includes a fastener configured to extend through the mounting tab and the mounting bracket to connect the airbag module to the vehicle.

17 Claims, 7 Drawing Sheets

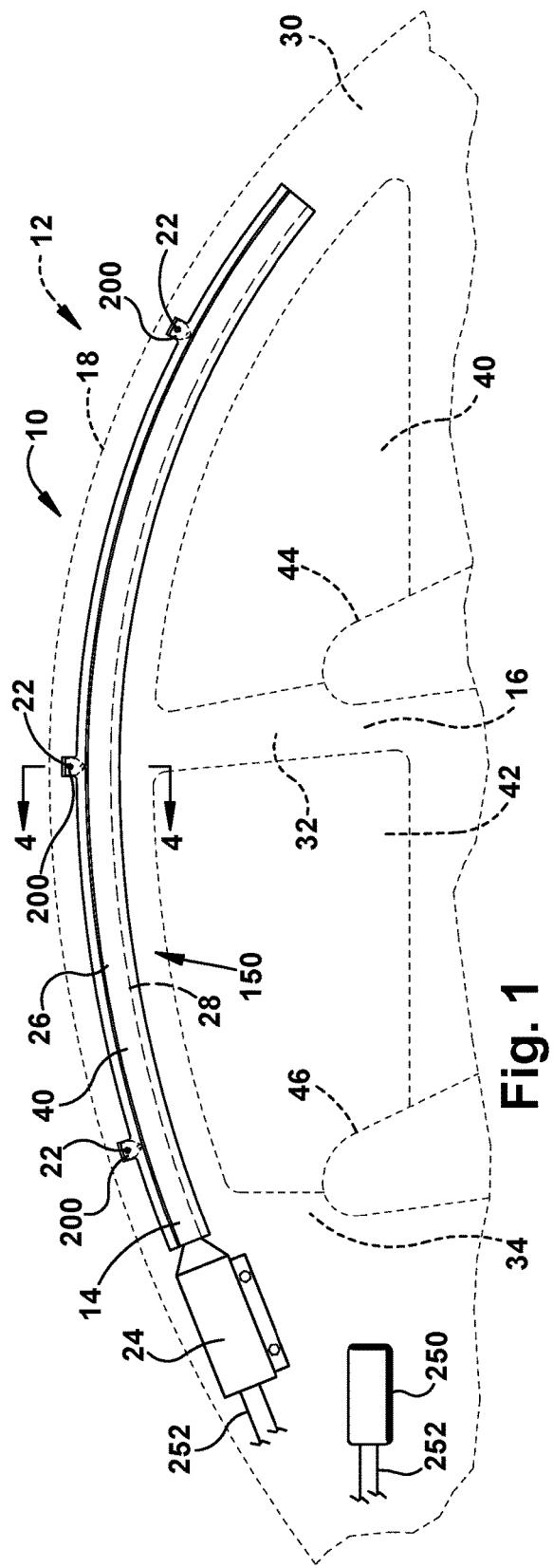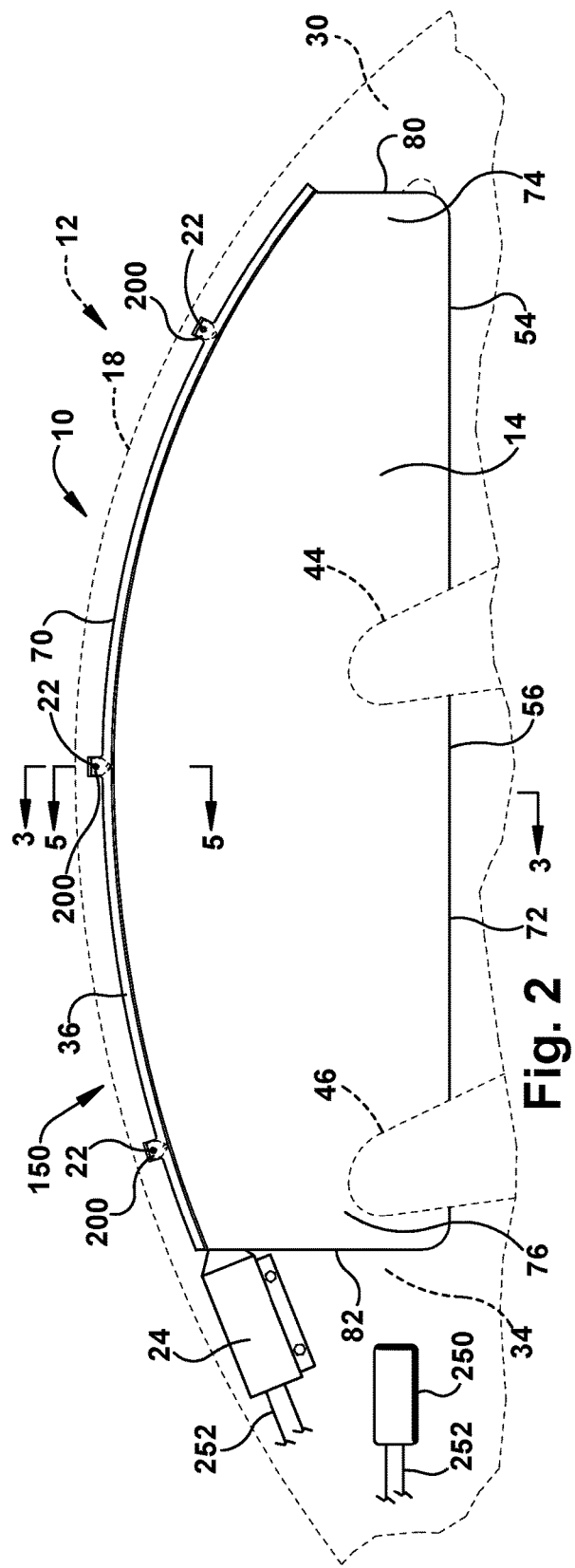

MOUNTING BRACKET FOR CURTAIN AIRBAG

TECHNICAL FIELD

This disclosure to an inflatable apparatus for helping to protect a vehicle occupant in the event of a side impact to the vehicle and/or a vehicle rollover. More specifically, this disclosure relates to a reinforcement bracket for curtain airbag mounting tabs.

BACKGROUND

It is known to inflate an inflatable vehicle occupant protection device to help protect a vehicle occupant. One particular type of inflatable vehicle occupant protection device is a curtain airbag. The curtain airbag is inflatable away from the roof of the vehicle between a vehicle occupant and the side structure of the vehicle in response to a side impact to the vehicle and/or a vehicle rollover. A known curtain airbag is inflated from a deflated condition with inflation fluid directed from an inflator to the curtain airbag.

When installed in a vehicle, curtain airbags can be connected to the vehicle via mounting tabs that extend from an edge, such as an upper edge, of the curtain airbag. The curtain airbag is connected to the vehicle via fasteners that extend through the mounting tabs into the vehicle structure. During deployment, the fabric mounting tabs can tear, e.g., due to forces concentrated on the openings through which the fasteners extend.

SUMMARY

An airbag module includes a curtain airbag configured to be connected to the vehicle via one or more mounting tabs. The airbag module also includes a mounting bracket for improving the strength of the connection between the airbag and the vehicle via the mounting tab(s). The mounting tabs are configured as loops of airbag material extending from an upper edge of the curtain airbag. The curtain airbag, in combination with the mounting tabs, defines a pocket that extends into the curtain airbag at the location of each mounting tab. The mounting tabs and pocket are formed as separate layers of airbag material.

The mounting bracket is configured to fit in the pocket with a portion extending from the pocket in between the layers of the mounting tab. The mounting tab includes aligned fastener openings in each layer of mounting tab material. The mounting bracket includes a fastener opening configured to align with the mounting tab fastener openings when the mounting bracket is installed in the pocket. The mounting bracket also includes a fastening structure that extends transversely from the surface of the mounting bracket. The fastening structure is configured to extend through an opening in an outboard layer of the pocket material. The mounting bracket is configured such that the bracket fastener opening aligns with the mounting tab fastener openings when the bracket is positioned in the pocket with the fastening structure extending through the pocket fastener opening.

The fastening structure, extending through the opening in the outboard layer of the pocket, can be configured to initially connect the airbag module to the vehicle by a simple insertion of the fastening structure into the vehicle structure, such as an opening in the vehicle sheet metal. The initial connection can be made with a push-in type action. In an example configuration, the fastening structure can be a fir tree fastener, which includes angled barbs spaced along its length, which insert easily through an opening in the vehicle structure, and thereafter forms an interference that resists removal from the vehicle structure. With the airbag module initially positioned via the fastening structure, a permanent fastener, such as a bolt or screw, can be installed to secure the airbag module to the vehicle.

According to one aspect, an airbag module for helping to protect an occupant of a vehicle includes a curtain airbag and a mounting bracket. The curtain airbag includes a mounting tab configured to receive a fastener for connecting the curtain airbag to the vehicle. The mounting bracket is configured to cooperate with the mounting tab to facilitate the connection of the curtain airbag to the vehicle via the fastener. The mounting bracket includes a generally planar body portion and a fastening structure that extends transversely from the body portion. The mounting tab includes overlying layers of material that help define a pocket configured to receive the mounting bracket. The mounting tab includes a first fastener opening configured to receive the fastening structure so that the fastening structure extends through the first fastener opening with the body portion positioned in the pocket. The fastening structure is configured for installation in the vehicle structure to initially support the airbag module in the vehicle. The airbag module further includes a fastener configured to extend through the mounting tab and the mounting bracket to connect the airbag module to the vehicle.

According to another aspect, the mounting tab can include a pair of second fastener openings that extend through the overlying layers of the mounting tab material. The second fastener openings can be configured to align with a fastener opening in the mounting bracket when the mounting bracket is installed in the pocket. The fastener opening in the mounting tab can be configured to receive the fastener and retain the fastener therein during initial installation of the airbag module via the fastening structure.

According to another aspect, the fastener opening in the mounting tab can be configured to form an interference fit with a shank of the fastener that retains the fastener in the mounting bracket.

According to another aspect, the fastener opening in the mounting tab can include a plurality of radially extending slots that allow portions of the mounting tab adjacent to the fastener opening in the mounting tab to deflect when receiving the fastener.

According to another aspect, the mounting bracket can include a body portion with a linear upper edge configured to form a close fit with an upper edge of the mounting tab when installed in the pocket, the upper edge being configured to engage the upper edge of the mounting tab to distribute airbag deployment forces along the upper edge of the mounting tab.

According to another aspect, the pocket can be configured to form a close fit with a body portion of the mounting bracket in order to help retain the bracket disposed therein and to help enforce an engagement of an upper edge of the body portion of the mounting bracket with an upper edge of the mounting tab.

According to another aspect, the body portion of the mounting bracket can include a tapered portion opposite the upper edge, the tapered portion being configured to facilitate insertion of the mounting tab into the pocket to install the fastening structure through the first fastener opening in the mounting tab, and to thereafter facilitate rotation of the mounting bracket about the fastening structure to position the upper edge of the body portion along the upper edge of the mounting tab.

According to another aspect, the pocket can further include a portion of the upper edge of the curtain airbag that is separate from an inflatable volume of the curtain airbag and comprises separate layers of airbag material.

According to another aspect, the fastening structure can facilitate an initial installation of the airbag module in the vehicle via a push-in connection.

According to another aspect, the fastening structure can be configured to form an interference fit with an opening in vehicle sheet metal to initially install the airbag module in the vehicle.

According to another aspect, the fastening structure can include a fir tree fastener.

According to another aspect, the mounting bracket can be constructed of a single piece of material.

According to another aspect, the mounting bracket can be constructed of a high-strength nylon plastic material, a high-density polyethylene (HDPE) material, a polypropylene (PP) material, and a thermoplastic polyolefin (TPO) material.

According to another aspect, the curtain airbag can have a one piece woven (OPW) construction.

According to another aspect, the mounting tab can also include a third fastener opening that extends through the material forming the pocket and overlies the first fastener opening. The third fastener opening can be configured to allow an installer to visualize the location where on the mounting bracket the fastening structure is located.

According to another aspect, the airbag module can also include an inflator that is actuatable to direct inflation fluid into the curtain airbag to inflate and deploy the curtain airbag. The inflator can be connected to the airbag.

According to another aspect, the airbag module can form one or more components of a vehicle safety system. The vehicle safety system can also include a sensor for sensing vehicle conditions and a controller that is operative to receive a signal from the sensor that is indicative of the sensed vehicle conditions. The controller can be operative to evaluate the signal from the sensor to identify vehicle crash conditions and to control the actuation of the inflator to inflate and deploy the curtain airbag in response to the identified vehicle crash conditions.

DRAWINGS

The foregoing and other features of the present disclosure will become apparent to one skilled in the art to which the present disclosure relates upon consideration of the following description with reference to the accompanying drawings, in which:

FIG. 1 is a schematic view of an apparatus for helping to protect a vehicle occupant illustrating the apparatus in a deflated and stored condition in a vehicle, according the present invention.

FIG. 2 is a schematic view of the apparatus of FIG. 1 in an inflated condition in the vehicle.

DETAILED DESCRIPTION

Figure 3:
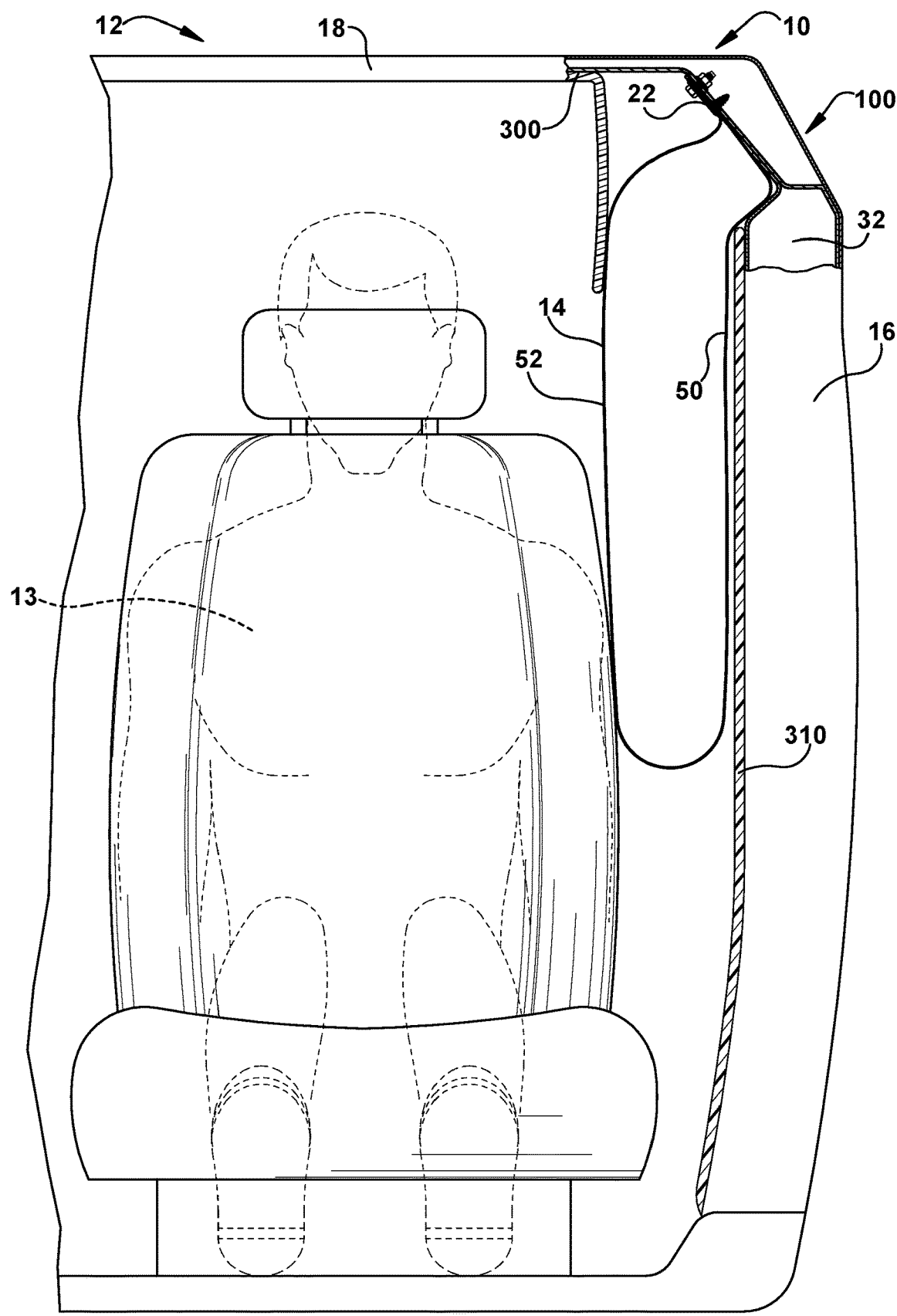
FIG. 3 is a sectional view taken generally along line 3-3 in FIG. 2.

An example configuration of an apparatus 10 for helping to protect an occupant of a vehicle 12 is shown in FIGS. 1 and 2. The apparatus 10 includes an inflatable vehicle occupant protection device in the form of a curtain airbag 14 that is mounted adjacent the side structure 16 of the vehicle 12 and the roof 18 of the vehicle by a series of fasteners 22 spaced along its length. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42. This configuration is by way of example only. The vehicle 12 can have any configuration that implements a curtain airbag.

An inflator 24 is connected in fluid communication with the curtain airbag 14. The inflator 24 contains a stored quantity of pressurized inflation fluid in the form of a gas for inflating the curtain airbag 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the curtain airbag 14.

The apparatus 10 also includes a cover 26 (FIG. 1), such as a woven or nonwoven fabric sheath, that packages and helps support the curtain airbag 14 in a stored and deflated condition. The deflated curtain airbag 14 and the cover 26 have an elongated configuration and extend along the vehicle roof 18 and along the side structure 16 of the vehicle 12 above the side windows 40 and 42. The curtain airbag 14, packaged in the cover 26, along with the inflator 24, form an airbag module 150 that can be installed in the vehicle as a unit. To facilitate this installation, the airbag module 150 can be connected to the vehicle 12 at mounting tabs 200 that are spaced along an upper edge portion 70 of the curtain airbag 14.

The curtain airbag 14 (FIG. 3) includes panels 50 and 52 of material that are arranged in an overlying manner. Overlapping portions of the panels 50 and 52 are interconnected along at least a portion of a perimeter 54 of the curtain airbag 14 to form a perimeter connection 56 of the curtain. The perimeter connection 56 helps define an inflatable volume of the curtain airbag 14. The curtain airbag 14 may also include interior connections (not shown) in which the overlying panels 50 and 52 are interconnected within the perimeter 54 to form non-inflatable portions that help define inflatable chambers of the curtain. In the installed condition of the airbag module 150, the panel 50 is an outboard facing panel of the curtain airbag 14

The curtain airbag 14 may be formed in a variety of manners, such as by weaving the overlying panels 50 and 52 in a one piece woven (OPW) construction in which yarns (e.g., nylon or polyester yarns) are woven simultaneously to form both one layer and two layer portions of the airbag. The curtain airbag 14 could alternatively be formed from separately woven panels that are interconnected, for example, by stitching, ultrasonic welding, heat bonding, or adhesives. The curtain airbag 14 may be coated with a gas impermeable material, such as urethane, or laminated with a gas impermeable film. The curtain airbag 14 thus may have a substantially gas-tight construction. Those skilled in the art will appreciate that alternative materials, such as polyester yarn, and alternatives coatings, such as silicone, can also be used to construct the curtain airbag 14.

The perimeter 54 of the curtain airbag 14 is defined at least partially by an upper edge 70, an opposite lower edge 72 of the curtain, and front and rear portions 74 and 76, respectively, of the curtain airbag spaced apart horizontally along the upper and lower edges. The front and rear portions 74 and 76 of the curtain airbag 14 include front and rear edges 80 and 82, respectively, that are spaced horizontally apart along the upper and lower edges 70 and 72 and extend between the upper and lower edges. The shape and dimensions of the curtain airbag 14 can, of course, vary, depending on factors such as the architecture of the vehicle and the desired coverage of the airbag.

Figure 4:
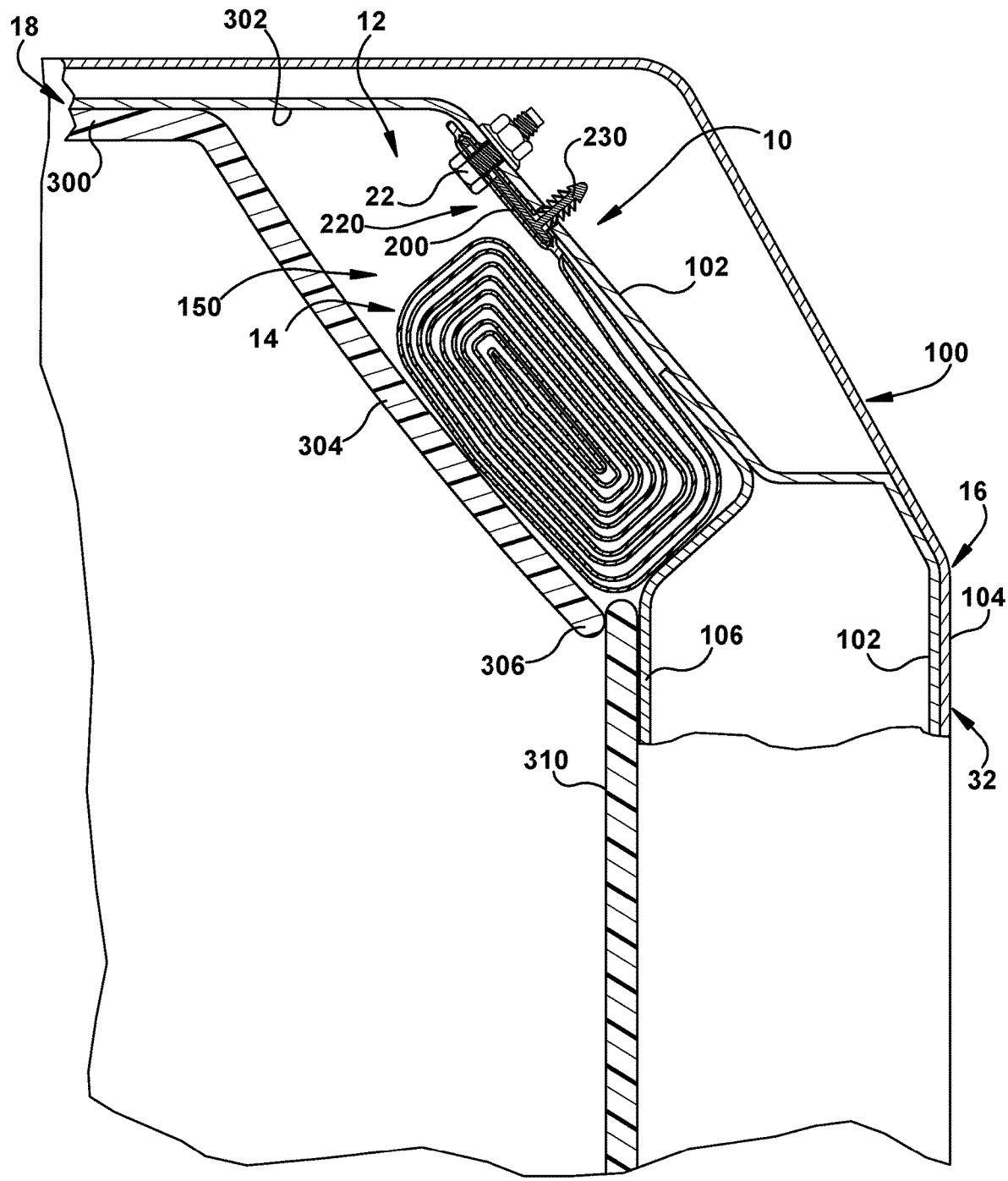
FIG. 4 is a sectional view taken generally along line 4-4 in FIG. 1.
Figure 5:
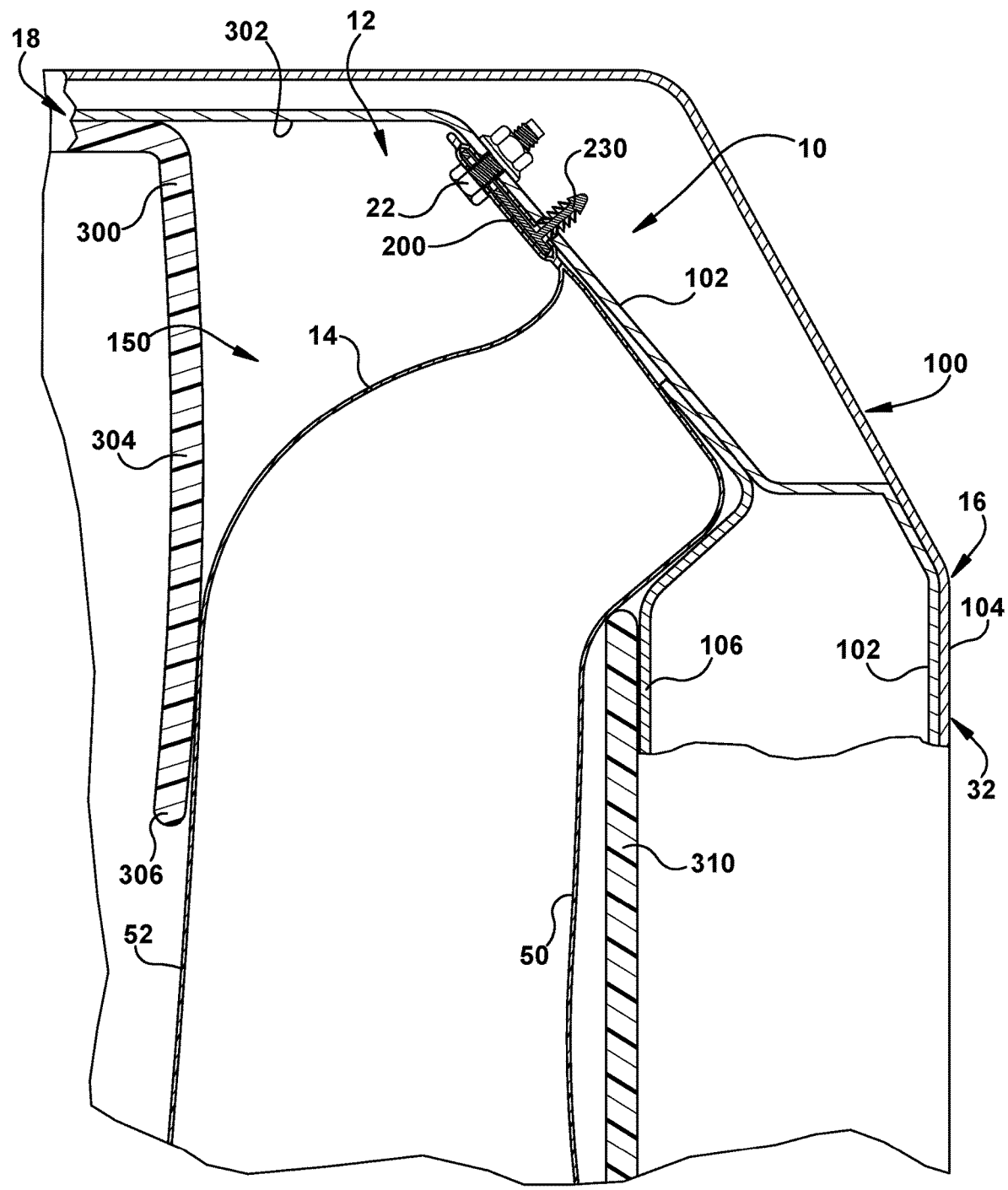
FIG. 5 is a sectional view taken generally along line 5-5 in FIG. 2.

Upon the occurrence of an event for which occupant protection is desired, an airbag controller 48 actuates the inflator 42 to provide inflation fluid to the inflatable volume 44 of the curtain airbag 14 to inflate and deploy the curtain airbag from the stored condition (see FIGS. 1 and 4) to the deployed condition (see FIGS. 2, 3, and 5). The curtain airbag 14 deploys in a generally downward direction, away from the roof 18, and becomes positioned between the side structure 16 of the vehicle and the occupant(s) 13 of the vehicle seats. In the example configuration illustrated in the figures, the curtain airbag 14, when in the deployed condition, covers a portion of the side structure 16 that includes portions of the A-pillar 30, B-pillar 32, and C-pillar 34 of the vehicle 12, and can help protect the occupant from impacts with the side structure and/or pillars.

During deployment, the curtain airbag 14 creates deployment forces that act on the connection between the airbag and the vehicle 12. Because of this, the airbag module 150 can include mounting brackets 220 that cooperate with the mounting tabs 200 to secure the curtain airbag 14 to the vehicle 12. Advantageously, the mounting tabs 200 also facilitate assembling the airbag module 150 as an installation-ready unit.

Figure 6:
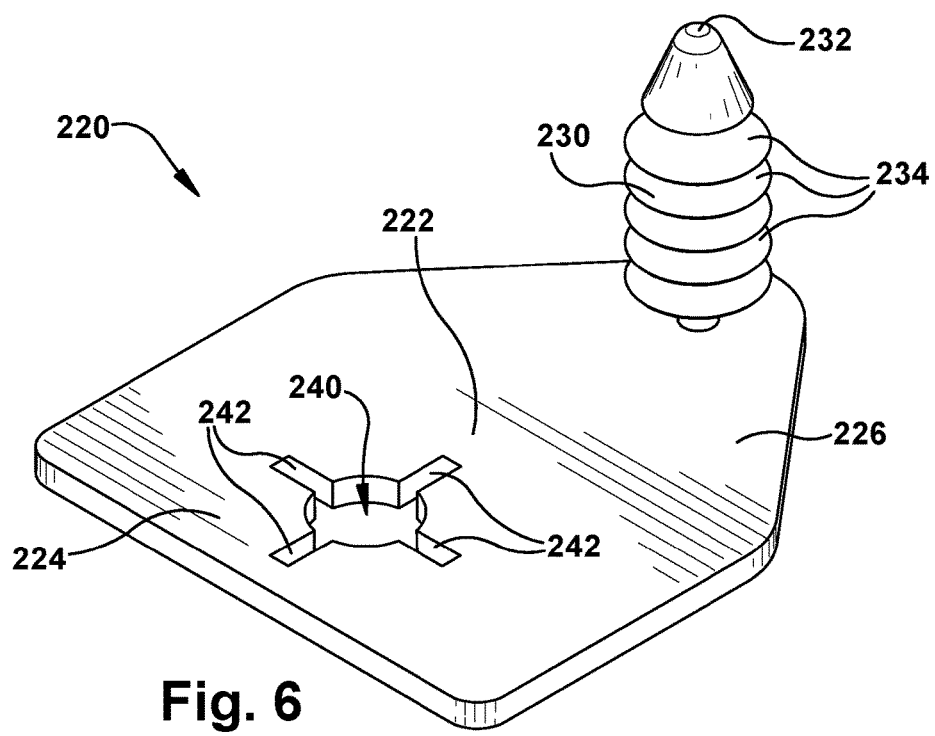
FIG. 6 is a perspective view illustrating a mounting bracket portion of the apparatus.

Referring to FIG. 6, the mounting bracket 220 has a generally planar body portion 222 with a rectangular upper portion 224 and a tapered or generally triangular lower portion 226. The rectangular upper portion 224 includes a linear upper edge 228. The body portion 222 can additionally be configured to have rounded corners where the various edges of the upper and lower portions 224, 226 intersect.

The mounting bracket 220 also includes a fastening structure 230 for initially securing the airbag module 150 in the vehicle during installation. In the example configuration illustrated in FIG. 6, the fastening structure 230 is what is commonly referred to as a fir tree fastener due to its having a shaft with a pointed tip 232 and angled barbs 234 that resemble a fir tree when viewed in profile. Fir tree fasteners can also be referred to as fir tree clips or rivets.

Fir tree fasteners are constructed of plastic and installed by simply pushing the barbs through openings (typically circular) in a structure to which they are to be connected. As the angled barbs pass through the openings, they deflect toward the shaft and then return toward their non-deflected condition once through the opening. This creates an interference between the barbs and the opening that serves to retain the fastener in the opening. Due to the angled nature of the barbs, pulling the fir tree fastener out of the opening causes the barbs to deflect outward, which further enforces the interference that retains the fastener in the opening.

The mounting bracket 220 also includes a fastener opening 240 configured to receive a fastener, such as a bolt or screw, for fixing the bracket and the airbag module 150 to the vehicle 12. The fastener opening 240 has a generally circular configuration and can include slots 242 that extend radially from the opening. In the example configuration, the fastener opening 240 includes four slots 242 that extend in radial directions that are 90 degrees apart. The slots 242 allow the fastener opening 240 to have a diameter configured to form an interference with the major diameter of the threaded shank portion of a threaded fastener so that the fastener can be retained in the opening due to the interference fit. The slots 242 allow portions of the mounting bracket 220 between the slots to deflect in order to facilitate installing a threaded fastener in the fastener opening 240. This deflection and the resulting interference can retain the fastener 22 in the fastener opening 240 prior to and during installation of the airbag module 150.

In some instances that the slots 242 are not necessary and might not be included. For example, the slots 242 could be omitted and a retention washer could be installed on the fastener shank on the outboard side of the mounting tab 200. As another example, where fasteners are not shipped with the airbag module assembly, but instead are added at the vehicle assembly plant, the slots 242 can be omitted.

The mounting bracket 220 has a high strength construction that can result from the use of a variety of materials. For example, the mounting bracket 220 can be formed of high-strength nylon plastic, high-density polyethylene (HDPE), polypropylene (PP), or a thermoplastic polyolefin (TPO). In this construction, the mounting bracket can have a molded construction so that the body portion 222 and fastening structure 230 can be formed as a one-piece component, which can improve the strength and integrity of the structure.

Figure 7:
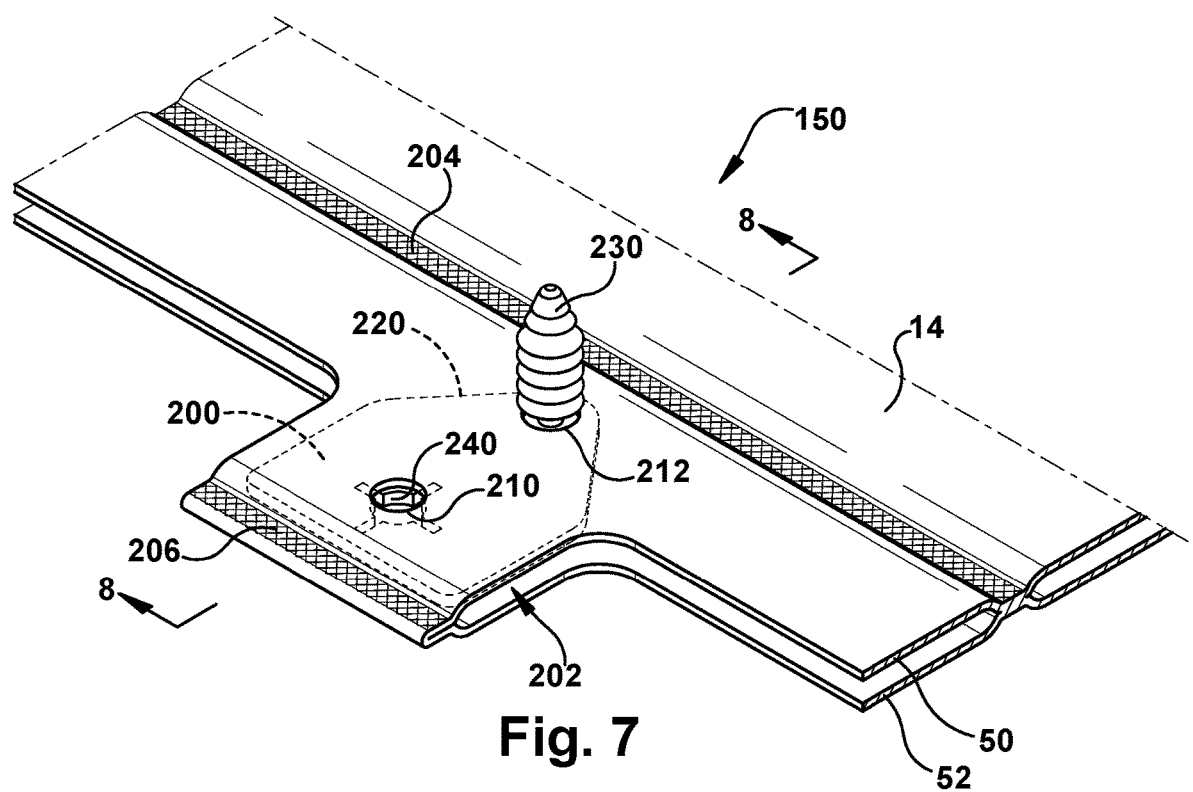
FIG. 7 is a perspective view illustrating the mounting bracket in an installed condition.

Referring to FIG. 7, the curtain airbag 14 is configured to have a pocket 202 in the area of the mounting tabs 200. The pocket 202 is located between the overlying airbag panels 50, 52 in an area of the curtain airbag 14 that includes the mounting tabs 200 and a portion of the airbag located at the upper edge 70. The pocket 202 is configured to receive the mounting bracket 220.

The pocket 202 is partially defined by connections 204, 206 of the panels 50, 52 at the periphery of the pocket 202. In an OPW construction of the curtain airbag 14, the connections 204, 206 can be areas of single layer OPW material at the periphery of the pocket. In a configuration where the panels are separate and assembled together, the connections 204, 206 can be stitching or welds that interconnect the panels 50, 52. The area of the connections 204, 206 between the panels 50, 52, whether it be a single layer OPW construction, a stitched construction, or a welded construction, is shown generally by areas of cross-hatching in FIG. 7. The width or thickness of the connections 204, 206 can be configured to be commensurate with the amount of stress experienced by the material during airbag deployment and the material properties of the airbag panels 50, 52.

The mounting tab 200 includes fastener openings 210 that extend through both layers 50, 52 of the airbag material. The fastener openings 210 are configured to receive the fastener 22 that connects the airbag module 150 to the vehicle 12 at the location of the mounting tab 200. The fastener openings 210 are therefore configured to align with the fastener opening 240 in the mounting bracket 220 when the bracket is installed in the pocket 202.

The mounting tab 200 also includes a fastener opening 212 that extends through the outboard layer 50 of the airbag material. The fastener opening 212 is configured to receive the fastening structure 230 of the mounting bracket 220 when the mounting bracket 220 is installed in the pocket 202. An opening on the inboard layer 52 that corresponds in location to the opening 212 can also be included and can serve as a visual indication to the installer of the location of the fastening structure 230 so that he or she can know where to apply installation pressure. This optional additional opening is shown at 214 in FIG. 10.

Figure 8:
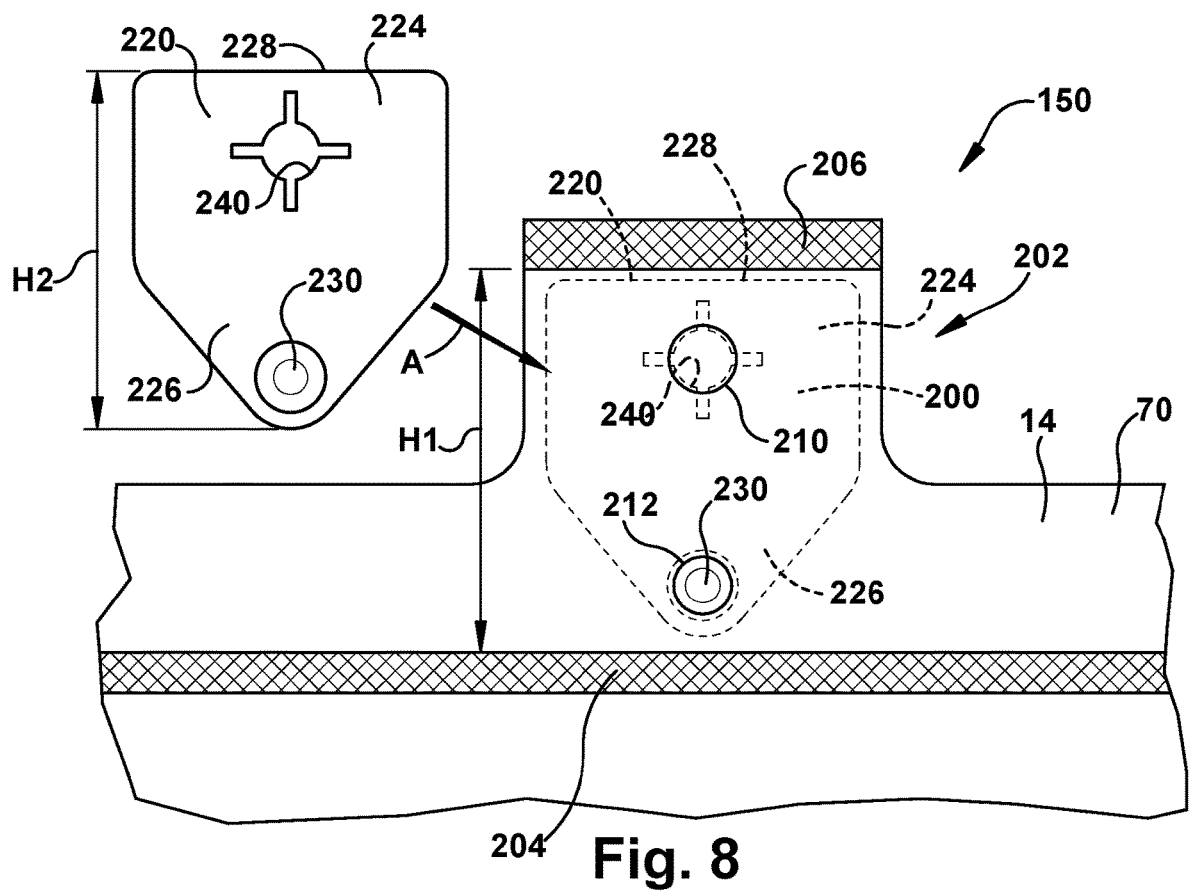
FIGS. 8 and 9 are schematic views illustrating the installation of the mounting bracket.

Referring to FIG. 8, the mounting bracket 220 is configured to be installed in the pocket 202 in order to reinforce the mounting tab 200 and to facilitate installation of the airbag module 150 in the vehicle 12 using the fastening structure 230. The mounting bracket 220 is inserted into the pocket 202 between the layers 50, 52, as indicated generally by the arrow labeled "A." Once inserted, the mounting bracket 220 is maneuvered until the fastening structure 230 extends through the fastener opening 212.

The pocket 202 and the mounting bracket 220 can be configured to achieve a close fit between the bracket and the pocket, and especially between the upper portion 224 of the bracket and the mounting tab 200. Because the fastening structure 230 projects from the surface of the mounting bracket 220, the layers 50, 52 of the pocket 202 must be separated or spaced a predetermined distance in order to facilitate insertion of the lower portion 226 of the bracket. Separating the layers 50, 52, however, reduces the height (indicated generally at "H1" in FIG. 8) of the pocket 202. Therefore, it can be appreciated that installing the mounting bracket 220 oriented vertically as shown in FIG. 8 would require that the height H1 of the pocket 202 be increased significantly over the height (indicated generally at "H2" in FIG. 8) of the mounting bracket 220.

Advantageously, the lower portion 226 of the mounting bracket 220 has a tapered configuration that facilitates a close-fit installation in the pocket 202. The tapered edges 236 eliminate corner portions that would otherwise be present if the mounting bracket 220 were rectangular. As such, the tapered edges 236 facilitate a direct insertion of the lower portion 226 with its tip 238 as the leading end during the installation process. This is shown in FIG. 9.

Figure 9:
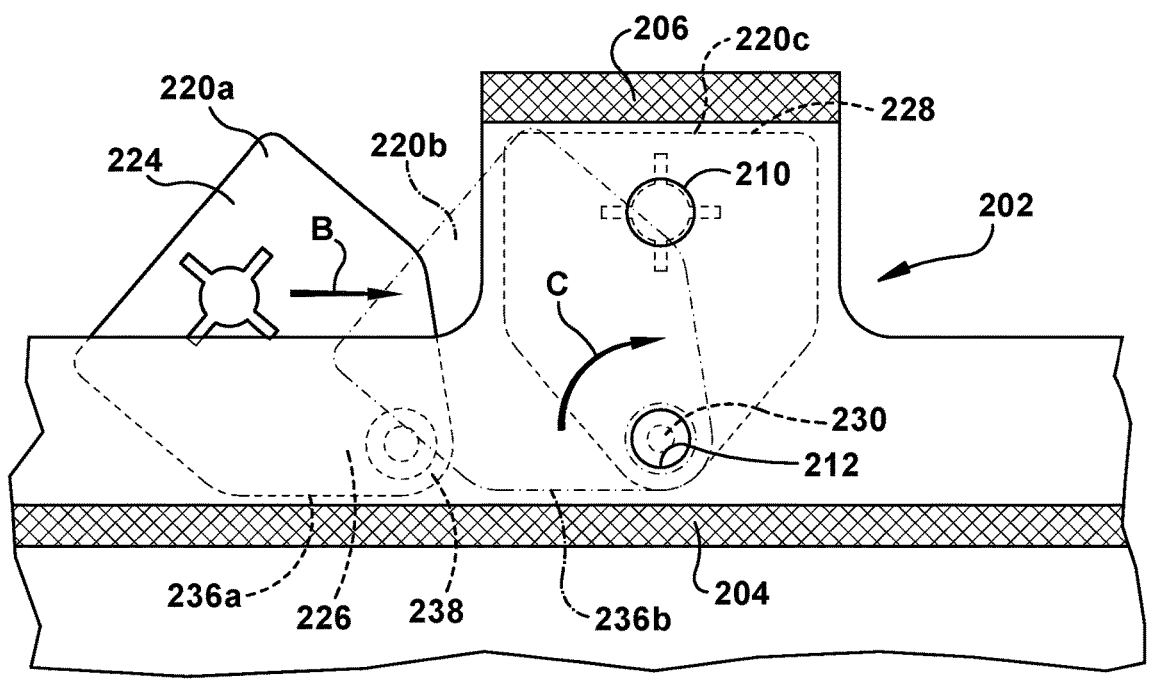

Referring to FIG. 9, prior to installation, the mounting bracket can be positioned at an angled orientation relative to the pocket 202. This is shown generally at 220a. In this position, it can be seen that one tapered edge 236a is positioned close and generally parallel to the connection 204.

Next, the mounting bracket 220a is maneuvered in the direction of arrow B into the pocket 202, to the position illustrated at 220b. The movement in the direction of arrow B can be linear in nature, with the tapered edge engaging, sliding along, and being guided by the connection 204 to the position illustrated at 236b. With the mounting bracket 220b at this orientation, the panels 50, 52 can be displaced away from each other in order to allow the fastening structure 230 to be installed through the fastener opening 212.

Next, the mounting bracket 220b is rotated about the fastening structure 230 in the direction of arrow C to the position illustrated at 220c. Because the fastening structure 230 is positioned in the fastener opening 212, the panels 50, 52 can be displaced away from each other to accommodate the rotational movement of the upper portion 224. Once rotated to the position illustrated at 220c, the upper edge 228 of the mounting bracket is positioned extending parallel and in close proximity to the connection 206. At the same time, the tip 238 is positioned in close proximity to the connection 204.

As a result, the mounting bracket 220, when installed in the pocket 202, can have a close fit with the pocket so that it is reliably held in place prior to installation of the airbag module 150. This can allow for packaging, shipping, and storing the airbag module 150 after its manufacture, but before installation in the vehicle 12.

Figure 10:
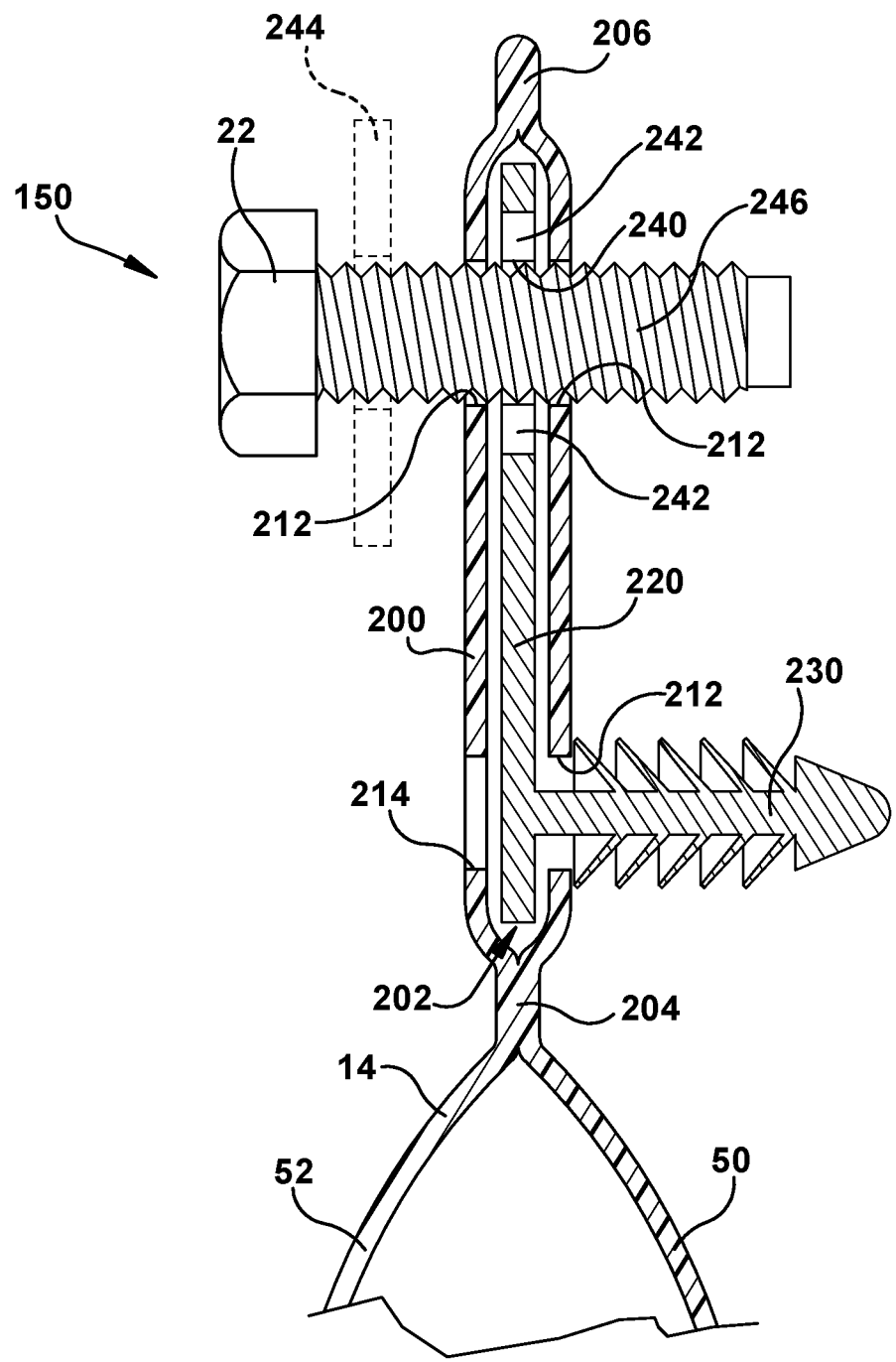
FIG. 10 is a sectional view illustrating the installation of the apparatus.

Additionally, the configuration of the mounting bracket 220 and pocket 202 allows for the fastener 22 to be included in the assemblage of the airbag module 150. Referring to FIG. 10, when the mounting bracket 220 is installed in the pocket 202 with the fastening structure 230 extending through the fastener opening 212, the fastener openings 212 of the mounting tab are aligned with the fastener opening 240 of the mounting bracket. This allows the fastener 22 to be installed through the aligned openings 212, 240. Advantageously, the fastener 22 (and an optional washer, shown in dashed lines at 244) is/are retained in the position shown in FIG. 10. This is because of the interference fit formed between the fastener 22 and the fastener opening 240. The interference fit is made possible due the slots 242, which allow adjacent portions of the mounting bracket 220 to deflect and accept the fastener shank 246 when inserted.

In the assembled condition of FIG. 10, the airbag module 150 is ready for installation in the vehicle. This is shown generally in FIG. 3 and in greater detail in FIGS. 4-5. The airbag module 150, when in the installed condition, extends along the roof rail 100 and along the intersection of the side structure 16 and the roof 18. The vehicle 12 includes a headliner 300 that extends along an inner surface 302 of the roof 18 of the vehicle. The headliner 300 has a portion 304 that extends at an acute angle relative to the roof 18 adjacent the airbag module 150. The portion 304 of the headliner 300 overlies the airbag module 150 and conceals the airbag module in the vehicle 12. A terminal end 306 of the headliner 300 is in abutting engagement with a trim piece 310 (FIG. 4) overlying the B pillar 32. Those having skill in the art will appreciate that the headliner 300 may also abut and engage a trim piece (not shown in FIG. 4, see FIG. 1) overlying the C pillar 34.

To initially install the airbag module 150 in the vehicle 12, the mounting structure 230 is installed in the vehicle sheet metal 102 by simply pressing the fastening structure into a corresponding opening 330 in the sheet metal. This initial installation is performed at the location of each mounting bracket 220 that is included in the airbag module 150. Then, with the airbag module 150 initially installed via the fastening structures 230, the fasteners 22 can be installed in their respective threaded fastener receivers 28. In the example configuration, the fasteners 22 are bolts and/or the fastener receivers 28 are nuts. The type of fastener and fastener receiver implemented in the airbag module 150 can, however, vary. For example, instead of a nut, the fastener receiver can be threaded stud fixed to the vehicle sheet metal. As another example, the fastener 22 can be a sheet metal screw and the fastener receiver 28 can be an opening in the sheet metal to which the sheet metal screw is attached directly.

Those skilled in the art will recognize that the configuration of the vehicle structure and, thus, the spatial and interconnecting relationships between the vehicle structure (i.e., the side structure 16, roof 18, and roof rail 100) and the headliner 300, trim piece 310, and airbag module 150, may vary depending upon the particular design of the vehicle 12.

Therefore, it should be recognized that the vehicle structure illustrated in FIGS. 4-5 and the spatial and interconnecting relationships between the vehicle structure and the headliner 300, the trim pieces 310 and 312, and the airbag module 150 are for illustrative purposes and may vary without departing from the spirit of the present invention.

The vehicle 12 includes a sensor mechanism 250 (shown schematically in FIGS. 1 and 2) for sensing the occurrence of an event for which inflation of the curtain airbag 14 is desired, such as a side impact to the vehicle 12 and/or a vehicle rollover. Upon sensing the occurrence of such an event, the sensor mechanism 250 provides an electrical signal over lead wires 252 to the inflator 24. The electrical signal causes the inflator 24 to be actuated in a known manner. The inflator 24, when actuated, discharges fluid under pressure into the curtain airbag 14.

The curtain airbag 14 inflates under the pressure of the inflation fluid from the inflator 24 and deploys away from the roof 18 in a downward direction as shown in the drawings and in a downward direction with respect to the direction of forward travel of the vehicle 12 into the position illustrated in FIGS. 2 and 5. The curtain airbag 14, when inflated, extends along the side structure 16 of the vehicle 12 and is positioned between the side structure and any occupant 13 of the vehicle. The curtain airbag 14 covers portions of the vehicle side structure that extend between the A pillar 30 and the C pillar 34 of the vehicle 12 and may overlie portions of the A pillar, C pillar, and the B pillar 32 of the vehicle. The curtain airbag 14, when inflated, may be positioned between the vehicle side structure 16 and the front and rear vehicle seating 44 and 46. The curtain airbag 14, when inflated, helps to protect a vehicle occupant 13 in the event of a vehicle rollover or a side impact to the vehicle 12. The curtain airbag 14, when inflated, also helps to absorb the energy of impacts with the curtain and helps to distribute the impact energy over a large area of the curtain.

Those skilled in the art will appreciate that the extent and coverage of the curtain airbag 14 in the vehicle 12 may vary. For example, the extent and coverage of the curtain airbag 14 may vary depending on a variety of factors, such as the architecture of the vehicle 12, the position of the curtain airbag in the vehicle, and the desired extent or coverage of the curtain airbag.

During inflation, the deploying airbag 14 can exert large forces at the mounting locations where the airbag is connected to the vehicle. If these forces are allowed to become concentrated at any particular location on the airbag, the resulting stress risers could lead to damage or failure at that location.

Advantageously, the airbag 14 and mounting brackets 220 are configured to help prevent these stress risers, and the associated damage/failure, from occurring. As described above, the configuration of the mounting bracket 220 and the pocket 202 facilitate a close fit between the body portion 222 of the mounting bracket and the mounting tab 200 of the airbag. Specifically, the connection of the body portion 222 to the vehicle via the fastener 22 can distribute the fastening force over a larger area than would the fastener alone. Additionally, the upper edge 228 of the body portion 222, having a close fir with the upper edge of the mounting tab 200 at the connection 206, can help distribute deployment forces across the width of the interface between the upper edge 228 and the connection 206. As a result, in addition to facilitating assembling the airbag module 150 as a ready-to-install unit with the fastening structure 230 acting as an initial positioning feature, it also helps distribute deployment forces in order to reduce or eliminate stress risers to thereby reinforce the connection of the airbag 14 to the vehicle via the fasteners 22.

From the above description of the invention, those skilled in the art will perceive improvements, changes and modifications. Such improvements, changes and modifications within the skill of the art are intended to be covered by the appended claims.

Having described the invention, the following is claimed:

1. An airbag module for helping to protect an occupant of a vehicle, comprising:
    a curtain airbag comprising a mounting tab configured to receive a fastener for connecting the curtain airbag to the vehicle; and
    a mounting bracket configured to cooperate with the mounting tab to facilitate the connection of the curtain airbag to the vehicle via the fastener, the mounting bracket comprising a generally planar body portion and a fastening structure that extends transversely from the body portion;
    wherein the mounting tab comprises overlying layers of material that help define a pocket configured to receive the mounting bracket, the mounting tab comprising a first fastener opening configured to receive the fastening structure so that the fastening structure extends through the first fastener opening with the body portion positioned in the pocket;
    wherein the fastening structure is configured for installation in the vehicle structure to initially support the airbag module in the vehicle, the airbag module further comprising a fastener configured to extend through the mounting tab and the mounting bracket to connect the airbag module to the vehicle.

2. The airbag module recited in claim 1, wherein the mounting tab comprises a pair of second fastener openings that extend through the overlying layers of the mounting tab material, the second fastener openings being configured to align with a fastener opening in the mounting bracket when the mounting bracket is installed in the pocket, the fastener opening in the mounting tab being configured to receive the fastener and retain the fastener therein during initial installation of the airbag module via the fastening structure.

3. The airbag module recited in claim 1, wherein the fastener opening in the mounting tab is configured to form an interference fit with a shank of the fastener that retains the fastener in the mounting bracket.

4. The airbag module recited in claim 1, wherein the fastener opening in the mounting tab comprises a plurality of radially extending slots that allow portions of the mounting tab adjacent to the fastener opening in the mounting tab to deflect when receiving the fastener.

5. The airbag module recited in claim 1, wherein the mounting bracket comprises a body portion with a linear upper edge configured to form a close fit with an upper edge of the mounting tab when installed in the pocket, the upper edge being configured to engage the upper edge of the mounting tab to distribute airbag deployment forces along the upper edge of the mounting tab.

6. The airbag module recited in claim 1, wherein the pocket is configured to form a close fit with a body portion of the mounting bracket in order to help retain the bracket disposed therein and to help enforce an engagement of an upper edge of the body portion of the mounting bracket with an upper edge of the mounting tab.

7. The airbag module recited in claim 6, wherein the body portion of the mounting bracket comprises a tapered portion opposite the upper edge, the tapered portion being configured to facilitate insertion of the mounting tab into the pocket to install the fastening structure through the first fastener opening in the mounting tab, and to thereafter facilitate rotation of the mounting bracket about the fastening structure to position the upper edge of the body portion along the upper edge of the mounting tab.

8. The airbag module recited in claim 1, wherein the pocket further comprises a portion of the upper edge of the curtain airbag that is separate from an inflatable volume of the curtain airbag and comprises separate layers of airbag material.

9. The airbag module recited in claim 1, wherein the fastening structure facilitates an initial installation of the airbag module in the vehicle via a push-in connection.

10. The airbag module recited in claim 1, wherein the fastening structure is configured to form an interference fit with an opening in vehicle sheet metal to initially install the airbag module in the vehicle.

11. The airbag module recited in claim 1, wherein the fastening structure comprises a fir tree fastener.

12. The airbag module recited in claim 1, wherein the mounting bracket is constructed of a single piece of material.

13. The airbag module recited in claim 1, wherein the mounting bracket is constructed of at least one of high-strength nylon plastic, high-density polyethylene (HDPE), polypropylene (PP), and thermoplastic polyolefin (TPO).

14. The airbag module recited in claim 1, wherein the curtain airbag has a one piece woven (OPW) construction.

15. The airbag module recited in claim 1, wherein the mounting tab further comprises a third fastener opening that extends through the material forming the pocket and overlies the first fastener opening, the third fastener opening being configured to allow an installer to visualize the location where on the mounting bracket the fastening structure is located.

16. The airbag module recited in claim 1, further comprising an inflator that is actuatable to direct inflation fluid into the curtain airbag to inflate and deploy the curtain airbag, wherein the inflator is connected to the airbag.

17. A vehicle safety system comprising the airbag module of claim 16, a sensor for sensing vehicle conditions, and a controller that is operative to receive a signal from the sensor that is indicative of the sensed vehicle conditions, the controller being operative to evaluate the signal from the sensor to identify vehicle crash conditions and to control the actuation of the inflator to inflate and deploy the curtain airbag in response to the identified vehicle crash conditions.

\* \* \* \* \*